United States Patent Office 3,544,495
Patented Dec. 1, 1970

3,544,495
DIAMINES AND DERIVATIVES
John R. Nazy, Kankakee, Ill., and Donald H. Wheeler, Minneapolis, Minn., assignors to General Mills, Inc., a corporation of Delaware
No Drawing. Original application June 24, 1966, Ser. No. 560,057, now Patent No. 3,449,423, dated June 10, 1969. Divided and this application Sept. 18, 1968, Ser. No. 760,730
Int. Cl. C08g 20/00, 20/26, 22/02
U.S. Cl. 260—18                          10 Claims

ABSTRACT OF THE DISCLOSURE

New diamines of the formula

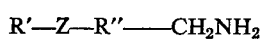

where R' is a monovalent straight chain aliphatic hydrocarbon radical containing 2 to 6 carbon atoms, R'' is a divalent straight chain aliphatic hydrocarbon radical containing 7 to 11 carbon atoms, the sum of the carbon atoms in R' and R'' is 13, and Z is a divalent radical of the structure

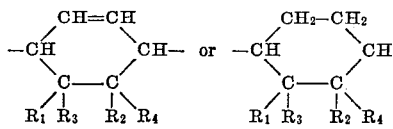

where $R_1$ and $R_2$ are H or $CH_3$ with the proviso that one of such radicals must be H and $R_3$ and $R_4$ are H or $CH_2NH_2$ with the proviso that one of such radicals must be H and the other must be $CH_2NH_2$. Polymers prepared from such diamines and urea, thiourea, a dicarboxylic acid of 2 to about 50 carbon atoms or mixtures thereof.

---

This application is a division of Ser. No. 560,057 filed June 24, 1966, now U.S. Patent No. 3,449,423.

The present invention relates to novel diamines and, more particularly, to new diamines derived from certain dinitriles prepared from conjugated fatty acid compounds and dienophiles. It also relates to the polyureas and polyamides prepared from the new diamines and urea, thiourea and dicarboxylic acids or mixtures thereof.

We have now discovered a new class of diamines having the idealized, general structural formula:

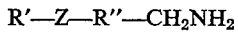

where R' is a monovalent straight chain aliphatic hydrocarbon radical containing 2 to 6 carbon atoms, R'' is a divalent straight chain aliphatic hydrocarbon radical containing 7 to 11 carbon atoms, the sum of the carbon atoms in R' and R'' is 13, and Z is a divalent radical of the structure

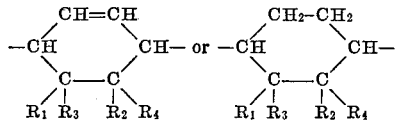

where $R_1$ and $R_2$ are H or $CH_3$ with the proviso that one of such radicals must be H and $R_3$ and $R_4$ are H or $CH_2NH_2$ with the proviso that one of such radicals must be H and the other must be $CH_2NH_2$.

Our new diamines are prepared by the hydrogenation of dinitriles of the idealized, general structural formula:

where R', R'', Z, $R_1$ and $R_2$ have the meanings set forth above and $R_3$ and $R_4$ of the radical Z are H or CN with the proviso that one of such radicals must be H and the other must be CN. The starting dinitriles are prepared in various ways. One preferred method is the first prepare an adduct of an acrylonitrile and a lower alkyl ester of a conjugated fatty acid and then convert the resulting mononitrile adduct to the dinitrile by reaction with ammonia. Another preferred method is to add an acrylonitrile to a conjugated fatty acid nitrile. The preparation of start starting dinitriles is illustrated by the following examples which are not to be considered as limiting.

EXAMPLE A

Three hundred seventy nine grams of distilled methyl esters of tung oil acids (containing 88% by weight or 1.12 mole methyl α-eleostearate) and 214 g. (4.04 mole) acrylonitrile (containing 0.2% by weight p-methoxy phenol) were charged into a one liter Magne-Dash autoclave. After sealing the autoclave, the pressure was raised to 1500 p.s.i. by the addition of nitrogen gas. The reaction mixture was heated to an initial temperature of 153° C. and held at 150–161° C. for four hours. It was then allowed to cool to a temperature of 25° C. over a period of 1⅓ hours at which point the pressure was gradually released. The product was filtered and then vacuum pump stripped at 90° C. There was obtained 425.5 g. of a clear yellow liquid which was then distilled through a spinning band column to give 283 grams of the monoadduct of acrylonitrile and methyl α-eleostearate (77% yield based on the conjugated methyl α-eleostearate).

A mixture of 268.5 g. (0.78 mole) of the monoadduct and 1.34 g. zinc oxide were charged into a 500 ml. round bottom flask equipped with a stirrer, thermometer, ammonia addition tube and gas trap. The mixture was heated at 275° C. as 251 g. ammonia was slowly bubbled through said mixture over a 24 hour period. The progress of the reaction was followed by subjecting small samples of the reaction mixture to infrared spectral analysis. At the end of the 24 hour reaction period, the reaction mixture was distilled through a spinning band column to give 78 g. of dinitrile boiling at 197–205° C./0.35 mm. Hg (33% yield taking into account the seven analytical samples totaling 38.2 g. withdrawn during the reaction period). The dinitrile had the following properties:

Nitrogen content (Kjeldahl)—8.70%
Refractive index $n_D^{25}$—1.4931

The calculated nitrogen content of the dinitrile having the empirical formula $C_{21}H_{32}N_2$ is 8.97%.

EXAMPLE B

Example A was essentially repeated except that 175 g. (0.51 mole) of the monoadduct of acrylonitrile and methyl α-eleostearate was heated at 275° C. for 22 hours with 0.88 g. zinc oxide as 263 g. ammonia was bubbled through the mixture. The product was distilled as in Example A to give 41.5 g. of dinitrile having the following properties:

Nitrogen content (Kjeldahl)—8.70%
Refractive index $n_D^{25}$—1.4959
Boiling point—187–194° C./0.32 mm. Hg.

Infrared spectra of the dinitriles of Examples A and B showed No. 5.75 or 5.95 micron absorption bands indicating that the dinitriles were free of ester and amide groups. The spectra had bands at 4.45 and 4.49 microns, however, which are characteristic of nitriles. While not isolated, the dinitriles of Examples A and B consisted essentially of isomers of the following structural formulae:

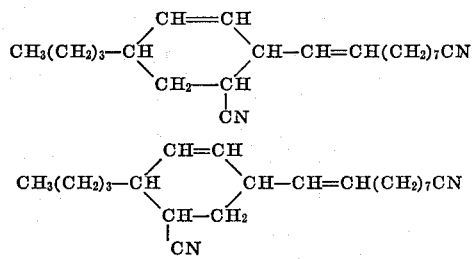

EXAMPLE C

Five hundred thirty two grams of the monoadduct of acrylonitrile and methyl α-eleostearate prepared similarly as in Examples A and B and 26.6 g. palladium catalyst (10% on carbon) were charged into a Magne-Dash autoclave. The autoclave was sealed and the pressure raised to 1000 p.s.i. by addition of hydrogen gas. The temperature was raised from an initial 26° C. to 130° C. over a period of 25 minutes and then held at 114–132° C. over a period of 2⅓ hours with addition of hydrogen to maintain the pressure at about 1000 p.s.i. The product was then cooled to 38° C. over a 50 minute period and the pressure was gradually released. The product was washed out with chloroform, filtered twice and then the chloroform was stripped therefrom using a rotary evaporator up to 60–65° C. under a vacuum of 1.7 mm. Hg. There was obtained 519 grams of product which was distilled through a spinning band column to yield 388 g. of saturated monoadduct of acrylonitrile and methyl α-eleostearate.

Three hundred three grams of the saturated adduct (0.867 mole) and 1.515 g. zinc oxide were placed in a one liter three neck flask equipped with a stirrer and an inlet and outlet for ammonia with a cold water trap. The mixture was heated at 275° C. as 223 grams ammonia was bubbled therethrough over a period of 16 hours. The progress of the reaction was followed by subjecting small samples of the reaction mixture to infrared spectral analysis. At the end of the 16 hour reaction period, the reaction mixture was distilled through a spinning band column to give 217 g. of dinitrile having the following properties:

Nitrogen content (Kjeldahl)—8.85%
Iodine value—5.2
Refractive index $n_D^{25}$—1.1470

The dinitrile consisted essentially of a mixture of unisolated isomers of the following structural formulae

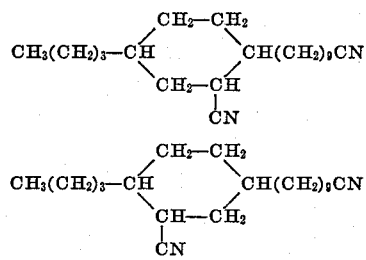

EXAMPLE D

In a 2000 ml. flask fitted with thermowell, reflux condenser and addition funnel was placed 1084 g. conjugated tall oil acid nitrile (containing 34% by weight or 1.46 mole conjugated linoleonitrile). One hundred milliliters (1.5 mole) acrylonitrile (containing 0.2% by weight p-methoxy phenol) and 0.5 g. iodine were added to the nitrile and then the reaction mixture was heated to reflux. The initial reaction temperature was 133° C. and the mixture was refluxed for 50 hours during which time another 100 ml. (1.5 mole) acrylonitrile and 10.5 g. iodine were added. The reaction temperature varied during the 50 hour reaction period from 110° C. to 142° C. Small samples were withdrawn during the reaction period to observe the progress of conjugation disappearance by infrared spectral analysis. After the reaction period was completed, the product was stripped under vacuum at 90° C. to remove unreacted acrylonitrile. The residue was then distilled through a spinning band column to give 251 g. of dinitrile which boiled at 219° C./56 mm. Hg and 212° C./0.45 mm. Hg (55% yield based on starting conjugated linoleonitrile taking into account the small analytical samples withdrawn). The dinitrile had the following properties:

Nitrogen content (Kjeldahl)—8.68%
Iodine number—89.4
Refractive index $n_D^{25}$—1.4805

The calculated nitrogen content and iodine number for the dinitrile having the empirical formula $C_{21}H_{34}N_2$ are 8.91% and 80.7, respectively. The dinitrile consisted essentially of a mixture of unisolated isomers of the following structural formulae:

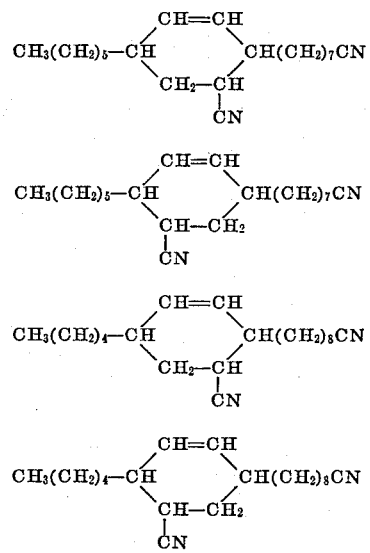

The starting conjugated nitrile used in the above Example D was prepared from the distilled mixture of nitriles derived from tall oil acid, such mixture being available under the trade name Alitrile 15D. The Alitrile 15D was heated at 140° C. with about 1% potassium t-butoxide for one hour to yield the starting conjugated nitrile.

EXAMPLE E

Into a 1000 ml. thermowell flask were charged 1.70 mole of the methyl ester of alkali conjugated linoleic acid (93% conjugated), 89 g. (1.68 mole) acrylonitrile (containing 0.2% by weight p-methoxy phenoy) and 2.08 g. iodine. The mixture was heated at reflux for 37 hours during which time the pot temperature increased from 100° C. to° 150° C. indicating that the reaction was 78% complete. The product was then heated under vacuum to remove unreacted acrylonitrile and distilled through a spinning band column to give a 65.5% yield of the monoadduct of acrylonitrile and the methyl ester of conjugated linoleic acid.

Three hundred thirty two grams of the monoadduct as above prepared and 1.66 g. zinc oxide were placed in a one liter three neck flask equipped with a stirrer and an inlet and outlet for ammonia with a cold water trap. The mixture was heated at 275° C. as 270 g. ammonia was bubbled therethrough over a period of 18–19 hours. At the end of the reaction period, the reaction mixture was distilled through a spinning band column to give 224 g. of dinitrile having the following properties:

Nitrogen content (Kjeldahl)—8.93%
Refractive index $n_D^{25}$—1.4797
Iodine number—79.0

The dinitrile consisted essentially of a mixture of unisolated isomers having the same structural formulae as the mixture of Example D.

A variety of other conjugated fatty acids and derivatives and dienophiles can be used in the preparation of the dinitriles. Representative of the other dienophiles are acrylic acid, methacrylic acid, crotonic acid, the $C_1$ to $C_8$ alkyl esters of such acids, methacrylonitrile, propiolactone and the like. The conjugated fatty acids used in the preparation of the dinitriles are those having two or more ethylenic bonds in the hydrocarbon chain, at least two of such ethylenic bonds being in conjugal relationship. Fatty acids containing 18 carbon atoms and two or more ethylenic bonds are commonly found in or derived from semi-drying and drying oils such as soy bean oil, tall oil, tung oil, linseed oil and the like. Specific illustrative 18 carbon atom acids are 9,12-octadecadienoic acid, 9,11-octadecadienoic acid, 10,12-octadecadienoic acid, 9,12,15-octadecatrienoic acid (linolenic acid), 6,9,12-octadecatrienoic acid, 9,11,13-octadecatrienoic acid (eleostearic acid) 10,12,14-octadecatrienoic acid (pseudo-eleostearic acid) and the like. Derivatives of the described fatty acids can also be used in the preparation of the dinitriles. Thus esters, such as the $C_1$ to $C_8$ alkyl esters, amides, nitriles, soaps and the like can be used. Where the fatty acid or derivative is unconjugated, conjugation of the double bonds can be effected by conventional techniques. Thus for example the acids and esters can be conjugated using well known alkali conjugation techniques. Also, the nitriles can be conjugated using isomerization catalysts such as alkali metal alkoxides. Similar known techniques can be used for the amides and the like.

The diamines of our invention are prepared from the described dinitriles by catalytic or chemical reduction of the dinitriles. Catalytic reduction is preferably accomplished by hydrogenation of the dinitrile over nickel or cobalt catalysts although certain noble metal catalysts such as palladium can also be used. The chemical reduction of the dinitriles can be accomplished using reducing agents such as lithium aluminum hydride. The preparation of the diamines of our invention is further illustrated by the following examples. Such examples are not to be considered as limiting.

EXAMPLE I

In a one liter Magne-Dash autoclave was placed 111 g. (0.36 mole) of dinitrile as prepared in Examples A and B. To the dinitrile was added 300 ml. benzene and 33 g. of No. 28 Raney nickel catalyst which had been washed twice with anhydrous methanol and then twice with benzene. The autoclave was sealed, purged with nitrogen and charged with 110 ml. (71 g.) liquid ammonia and hydrogen gas to bring the pressure to 1500 p.s.i. The mixture was heated at 120° C.±10° C. for 1¾ hours with hydrogen addition to maintain the total pressure above 1300 p.s.i. The autoclave was cooled and discharged and the resulting solution filtered and stripped of ammonia and solvent to give 112 g. of crude product. A 105 g. portion of the crude product was distilled through a spinning band column giving 89.5 g. (84% yield) of diamine having the following properties:

Boiling point—155–179° C./0.3 mm. Hg
Refractive index $n_D^{25}$—1.4956
Amine number—341
Secondary and tertiary amine number—0.26
Nitrogen content (Kjeldahl)—8.45%

The calculated amine number and nitrogen content of the diamine having the empirical formula $C_{21}H_{40}N_2$ are 350 and 8.74%, respectively. The diamine was thus 97% pure and consisted essentially of a mixture of unisolated isomers of the structure formulae:

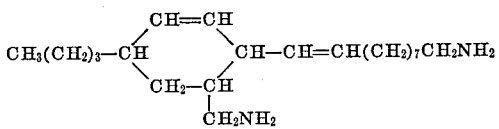

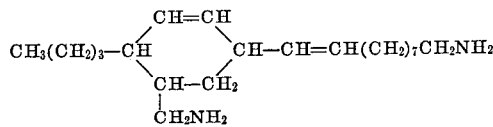

EXAMPLE II

Example I was repeated using 230 g. of dinitrile as prepared in Example D, 196 g. anhydrous methanol, 46 g. No. 28 Raney nickel catalyst which had been washed three times with anhydrous methanol and 150 ml. (98 g.) liquid ammonia. The hydrogenation was carried out at 108°±4° C. for 2¼ hours under hydrogen at a total pressure of 1750 p.s.i. The crude product was distilled as in Example I giving 198 g. (84% yield) of diamine having the following properties:

Boiling point—202–8° C./1 mm. Hg
Refractive index $n_D^{25}$—1.4861
Amine number—334.6
Secondary and tertiary amine number—0.26
Nitrogen content (Kjeldahl)—8.57%
Iodine number—72.2

The calculated amine number and nitrogen content of the diamine of the empirical formula $C_{21}H_{42}N_2$ are 347.8 and and 8.74%, respectively. The diamine was thus 97% pure and consisted essentially of an unisolated mixture of isomers of the structural formulae:

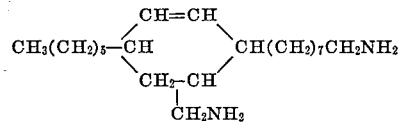

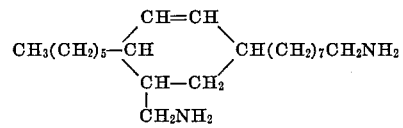

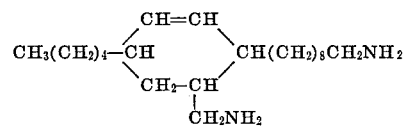

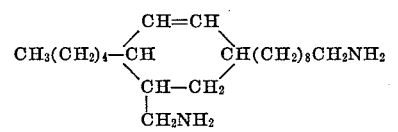

EXAMPLE III

Example I was repeated using 205 g. of dinitrile as prepared in Example C, 200 ml. anhydrous methanol, 30.8 g. No. 27 Raney cobalt catalyst which had been washed three times with anhydrous methanol, and 150 ml. (98 g.) liquid ammonia. The hydrogenation was carried out at 140° C.±3° C. for 1½ hours under hydrogen at a total pressure of 1700 p.s.i. The crude products was distilled as in Example I giving 196 g. (93% yield) of diamine having the following properties:

Boiling point—175° C./0.4 mm. Hg
Refractive index $n_D^{25}$—1.4812
Amine number—342.4
Secondary and tertiary amine number—0.44
Nitrogen content (Kjeldahl)—8.54%
Iodine number—7.4

The calculated amine number and nitrogen content of the diamine of the empirical formula $C_{21}H_{44}N_2$ are 345.7 and 8.63%, respectively. Thus the diamine is 96% pure as determined by amine number and consists essentially of a mixture of unisolated isomers having the structural formulae:

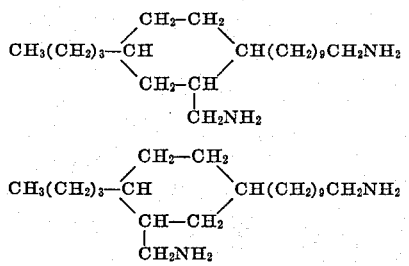

EXAMPLE IV

Example I was repeated using 206 g. (0.66 mole) of dinitrile as prepared in Example E, 200 ml. anhydrous methanol, 31.5 g. No. 27 Raney cobalt catalyst which had been washed three times with anhydrous methanol, and 150 ml. (98 g.) liquid ammonia. The hydrogenation was carried out at 140° C.±2° C. for 2¼ hours under hydrogen at a total pressure of 1600 p.s.i. The crude product was distilled as in Example I to give 189.5 g. (90% yield) of diamine having the following properties:

Boiling point—166–174° C./0.2 mm. Hg
Refractive index $n_D^{25}$ —1.4859
Amine number—348.5
Secondary and tertiary amine number—<0.4
Nitrogen content (Kjeldahl)—8.58%
Iodine number—60.0

The calculated amine number and nitrogen content of the diamine of the empirical formula $C_{21}H_{42}N_2$ are 347.8 and 8.68%, respectively. The very pure diamine consisted essentially of a mixture of unisolated isomers of the same structural formulae as the diamine of Example II.

The diamines of our invention are particularly valuable for preparing polyurea and polyamide polymers, the said polymers also forming a part of our invention. The polymers are prepared by reacting the new diamines (or mixtures thereof with a second diamine) with urea, thiourea, a dicarboxylic acid of 2 to 50 carbon atoms or mixtures of such reactants. The reaction is conducted at temperatures of about 120° C. to 400° C. and preferably at temperatures of 120–300° C. Since essentially linear polymers are desired, substantially equivalent amounts of the diamine and the urea, thiourea or dicarboxylic acid are used. However, small excesses of either reactant may be employed. Thus the equivalent ratio of the diamine to the urea, thiourea or dicarboxylic acid may be in the range of 1.2 to 1 to 1 to 1.2.

Any dicarboxylic acid having from 2 to about 50 carbon atoms of aliphatic, cycloaliphatic or aromatic structure, either substituted or unsubstituted, may be used. Among the preferred dicarboxylic acids are the following: succinic, sebacic, terephthalic, adipic, glutaric, pimelic, suberic, azelaic and dimerized fat acids prepared by polymerizing monobasic aliphatic carboxylic acids of 8 to 24 carbon atoms. The preparation of the latter compounds is well known and can be carried out by conventional techniques. It is, of course, to be understood that in addition to the specific dicarboxylic acids referred to, other saturated or unsaturated dicarboxylic acids having straight or branched chains may be used, as well as acids having various substituents such as Cl or OH groups.

As indicated a portion of the new diamines of our invention may be replaced by a second diamine in the preparation of the polymers of the present invention. Such second diamines can preferably be illustrated by the general formula $$H_2N-R'''-NH_2$$

where R is selected from the group consisting of aliphatic and aromatic groups of 2 to about 50 carbon atoms. Representative of such compounds are:

ethylene diamine
propylene diamine
1,2-diaminobutane
1,3-diaminobutane
trimethylene diamine
tetramethylene diamine
pentamethylene diamine
hexamethylene diamine
decamethylene diamine
octadecamethylene diamine
phenylene diamine
metaxylene diamine
paraxylene diamine
cyclohexane diamine
bis-aminoalkyl ethers and the diamines having 16 to 48 carbon atoms derived from dimerized fat acids prepared by the polymerization of monobasic aliphatic carboxylic acids of 8 to 24 carbon atoms. Preferably, the second diamine is an aliphatic diamine. Up to about 75 mole percent of our new diamines can be replaced by the described second diamines in the preparation of the polymers of the present invention.

The following examples serve to illustrate the preparation of the polymers of our invention. However, such examples are not to be considered as limiting.

EXAMPLE V

In a one liter resin flask fitted with a reflux condenser and an inlet and outlet for nitrogen gas were charged 268 g. (0.951 equiv.) dimerized fat acid prepared by the polymerization of the mixture of acids derived from tall oil (containing about 91% dimerized fat acid consisting mainly of dimerized oleic and linoleic acid), 14.1 g. (0.461 equiv.) ethylene diamine and 74.5 g. diamine as prepared in Example IV above. Fifty milliliters of xylene and four drops of $H_3PO_4$ where added. The reaction mixture was heated gradually until a pot temperature of 250° C. was reached at which point most of the xylene had distilled off as well as by-product water. Heating was continued at 250° C. for an additional two hours while purging the reaction mixture with nitrogen gas. Then the reaction mixture was heated two more hours at 250° C. under a vacuum of 5–15 mm. Hg. After completion of the latter period, the product was cooled and a portion thereof molded in a heated press at 125° C. to form a sheet 0.050 in. thick. The polyamide had the following properties:

Melt viscosity—31.5 poise/225° C.
Ball and ring melting point—91° C.
Amine number—0.6
Acid number—5.5

The molded product had a yield strength of 190 p.s.i., an ultimatetensile strength of 235 p.s.i. and a percent elongation of 1760 as measured on an Instron Tensile Testing Instrument, Type TT–C.

EXAMPLES VI–IX

Example V was repeated using the following acid and diamine reactants:

Example VI:
  423 g. (1.500 equiv. dimerized fat acid
  19.3 g. (0.265 equiv.) adipic acid
  38.5 g. (1.258 equiv.) ethylenediamine
  67.5 g. (0.419 equiv.) diamine of our invention
Example VII:
  282 g. (1.00 equiv.) dimerized fat acid
  9.9 g. (0.133 equiv.) adipic acid
  177.6 g. (1.102 equiv.) diamine of our invention
Example VIII:
  282 g. (1.00 equiv.) dimerized fat acid
  46 g. (0.450 equiv.) sebacic acid
  226.8 g. (1.407 equiv.) diamine of our invention Example IX:
51.4 g. (0.7035 equiv.) adipic acid
113.4 g. (0.7035 equiv.) diamine of our invention The dimerized fat acid and the diamine of our invention used in the above examples were the same as used in Example V. The polyamides and the molded specimens thereof had the properties as set forth in the following Table I.

TABLE I

| Polyamide | Melt viscosity, poise/° C. | Ball and ring melting point, ° C. | Amine No. | Acid No. | Yield strength, p.s.i. | Ultimate tensile strength, p.s.i. | Percent elong. |
|---|---|---|---|---|---|---|---|
| Exp. VI | 20.5/225 | 164 | 0.6 | 7.4 | 567 | 1,134 | 618 |
| Exp. VII | 102/225 | 113 | 0.0 | 4.2 | 38 | (*) | >2,000 |
| Exp. VIII | 67/240 | 111 | 0.1 | 5.1 | 57 | (*) | >2,000 |
| Exp. IX | | 155 | 0.4 | 4.2 | 4,805 | 6,317 | 357 |

*Not measurable because elongation exceeded limit of equipment.

From the above examples it is apparent that the new polymers of our invention prepared from dicarboxylic acids have good properties for various applications such as moldings, coatings, adhesives and the like. The following Example X shows that the polymers prepared from urea and our new diamines are also highly useful for such purposes as preparing moldings.

EXAMPLE X

Equivalent amounts of diamine (106.0 g.) as prepared in Example III and urea (18.4 g.) were heated in 997 g. of m-cresol at reflux (200° C.) during which time ammonia was given off. After two hours, distillation of the m-cresol was begun. When 800 g. of m-cresol had been distilled off, the reaction mixture was cooled and slurried with one gallon of methanol yielding a gummy precipitate. The precipitate was washed with hot methanol and then heated under vacuum at 250° C. for four hours. The resulting polymer was a dark, brittle solid which when molded at 350° F. gave a molded specimen having an ultimate tensile strength of 760 p.s.i. at 29% elongation.

The embodiments of the invention in which an exclusive property or privilege is claimed are defined as follows:

1. A polymer prepared by reacting substantially equivalent amounts of (A) urea, thiourea, or a dicarboxylic acid of 2 to about 50 carbon atoms with (B) a diamine of the formula

R'—Z—R"—CH$_2$NH$_2$ where R' is a monovalent straight chain aliphatic hydrocarbon radical containing 2 to 6 carbon atoms, R" is a divalent straight chain aliphatic hydrocarbon radical containing 7 to 11 carbon atoms, the sum of the carbon atoms in R' and R" is 13, and Z is a divalent radical of the structure

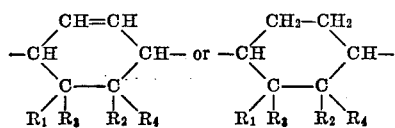

where R$_1$ and R$_2$ are H or CH$_3$ with the proviso that one of such radicals must be H and R$_3$ and R$_4$ are H or CH$_2$NH$_2$ with the proviso that one of such radicals must be H and the other must be CH$_2$NH$_2$.

2. A polymer according to claim 1 wherein the equivalent ratio of (A) to (B) is in the range of 1.2:1 to 1:1.2.

3. A polymer according to claim 1 wherein Z is

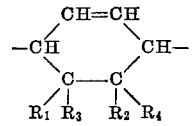

4. A polymer according to claim 1 wherein Z is

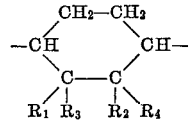

5. A polymer according to claim 4 where (A) is urea, R$_1$ and R$_2$ are H, R' is CH$_3$(CH$_2$)$_3$— and R" is —(CH$_2$)$_8$—.

6. A polymer according to claim 1 wherein (A) is a dimerized fat acid prepared by polymerizing a monobasic aliphatic carboxylic acid of 8 to 24 carbon atoms.

7. A polymer according to claim 6 wherein the monobasic aliphatic carboxylic acid is a mixture of oleic acid and lineolic acid, Z is

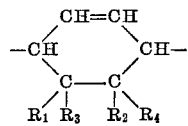

and R$_1$ and R$_2$ are H.

8. A polymer according to claim 1 wherein (A) is adipic acid.

9. A polymer according to claim 1 wherein up to 75 mole percent of the diamine (B) is replaced by a second diamine of the formula

H$_2$N—R'''—NH$_2$ where R''' is an aliphatic or aromatic group of 2 to about 50 carbon atoms.

10. A polymer according to claim 9 wherein the second diamine is ethylene diamine.

References Cited

UNITED STATES PATENTS

| | | | |
|---|---|---|---|
| 3,483,237 | 12/1969 | Peerman et al. | 260—404.5 |
| 3,475,406 | 10/1969 | Vertnik et al. | 260—18 |
| 3,449,423 | 6/1969 | Nazy et al. | 260—563 |
| 3,399,224 | 8/1968 | Nazy et al. | 260—424 |
| 3,352,836 | 11/1967 | Schmitt et al. | 260—78 |
| 3,242,141 | 3/1966 | Vertnik et al. | 260—78 |

FOREIGN PATENTS

| | | | |
|---|---|---|---|
| 1,102,677 | 2/1968 | Great Britain | 260—563 |

DONALD E. CZAJA, Primary Examiner

C. W. IVY, Assistant Examiner

U.S. Cl. X.R.

260—77.5, 78, 404.5

PO-1050
(5/69)

UNITED STATES PATENT OFFICE
CERTIFICATE OF CORRECTION

Patent No. 3,544,495                    Dated    December 1, 1970

Inventor(s) John R. Nazy, Donald H. Wheeler

It is certified that error appears in the above-identified patent and that said Letters Patent are hereby corrected as shown below:

Column 2, line 5, "the" should read --to--; line 11, "start should read --the--; line 69, "No." should read --no--. Column 4, line 60, "phenoy" should read --phenol--; line 63 "to°" should read --to--. Column 5, line 39, "dimaines" sh read --diamines--. Column 6, line 33, "8.74%" should read --8.68%--; line 33, "97%" should read --96.3%--; line 66, "products" should read --product--. Column 8, line 37, "wh should read --were--; line 72, delete "m".

Signed and sealed this 4th day of May 1971.

(SEAL)
Attest:

EDWARD M. FLETCHER, JR.          WILLIAM E. SCHUYLER, J
Attesting Officer                Commissioner of Patent